Oct. 17, 1933.   R. K. LEE   1,931,027
VIBRATION DAMPER
Filed Nov. 22, 1930
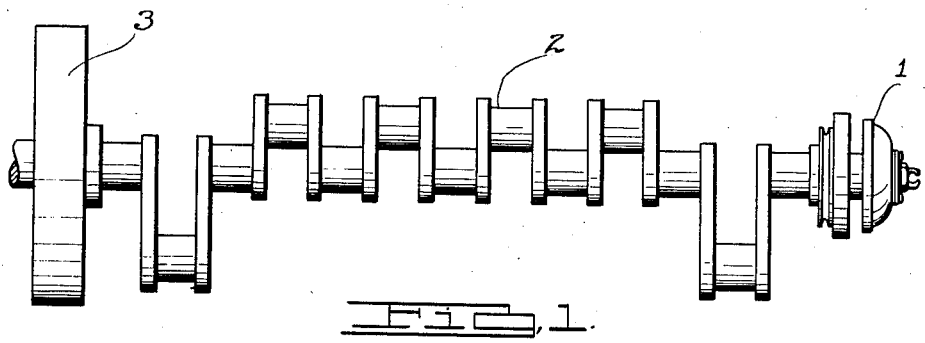
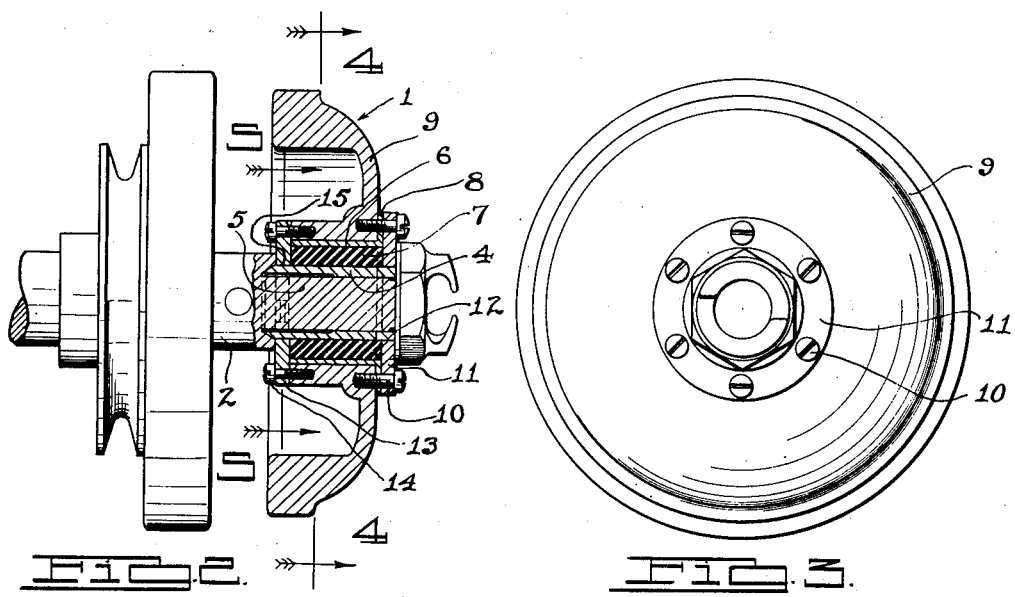
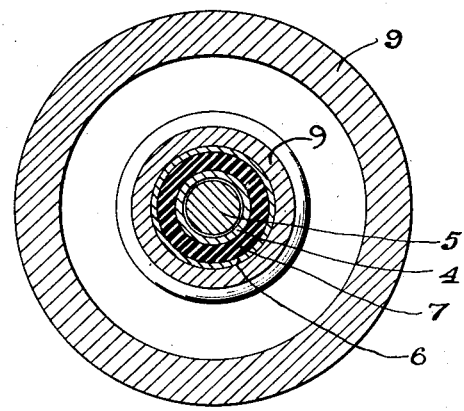
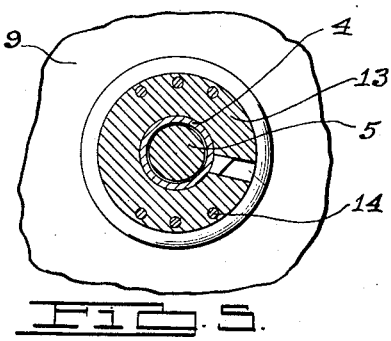
INVENTOR
ROGER K. LEE.
BY
ATTORNEY Patented Oct. 17, 1933

1,931,027

UNITED STATES PATENT OFFICE 1,931,027

VIBRATION DAMPER

Roger K. Lee, Highland Park, Mich., assignor to Chrysler Corporation, Detroit, Mich., a corporation of Delaware Application November 22, 1930
Serial No. 497,526

2 Claims. (Cl. 74—6)

This invention relates to torsional vibration dampers for internal combustion engines.

The main objects of the invention are to provide an improved vibration damper of the type which includes a rotatable hub element and an inertia ring that is concentrically mounted and yieldably connected to the rotatable member by rubber or other suitable yielding means; to provide an inertia member of this kind which is journaled on the hub so as to obviate displacement of the inertia member from a concentric relationship with respect to the hub and to protect the yieldable connecting means from radial thrust; and to provide a vibration damper of this character in which a relatively sensitive yieldable connection between the hub and inertia member may be employed and which will operate satisfactory and will not be subjected to wobbling due to displacement of the inertia member from its normal concentric relationship with the hub.

An illustrative embodiment of the invention is shown in the accompanying drawing, in which:

Fig. 1 is a side elevation of a multi-throw crankshaft which is equipped at one end with my improved vibration damper.

Fig. 2 is a central vertical section of my improved vibration damper.

Fig. 3 is an outer end elevation of the damper shown in Fig. 2.

Fig. 4 is a vertical transverse section taken on the line 4—4 of Fig. 2.

Fig. 5 is a vertical transverse section taken on the line 5—5 of Fig. 2.

Heretofore, in vibration dampers of this kind, the inertia element has been supported solely upon a rubber sleeve, or other yielding means which is secured both to the inertia member and to its supporting hub. When the yieldable element is solely relied upon to support the inertia element, the latter tends to become eccentric with respect to the hub, particularly when the yieldable element is not exactly uniform in its general consistency.

In the present invention, the inertia ring is provided with flanges which are journaled on the hub member so as to maintain the inertia element in concentric relation with respect to the hub under all conditions. The flanges occur at the respectively opposite sides of the inertia ring and therefore close the space between the outer periphery of the hub and the peripheral wall of the opening in the ring in which the hub is received, thus the yieldable connecting element is entirely enclosed.

In the form shown, my improved vibration damper 1 is illustrated as being mounted on one end of a crankshaft 2, on the other end of which is provided a conventional flywheel 3. The damper includes an inner sleeve or hub part 4, preferably comprising brass, which is keyed or otherwise secured against rotation on a reduced end portion 5 of the crankshaft 2. An outer sleeve 6, preferably comprising brass and having a diameter larger than the outer diameter of the inner sleeve 4, is concentrically mounted with respect to the inner sleeve and is yieldably secured thereto by a rubber connecting element 7, the end portions of the inner sleeve 4 protruding beyond the ends of the outer sleeve 6. The connecting element 7 is preferably held under compression between the adjacent peripheries of the two sleeves and it is bonded by vulcanization, or otherwise suitably secured to the sleeves.

Formed on the outer end of the outer sleeve 6 is a radially outwardly extending flange 8 on which an inertia ring 9, comprising iron or other heavy metal, is mounted by screws 10. The screws 10 also secure the inertia member 9 and flange 8, to a ring or flange 11 which has a bearing surface 12 at its inner periphery journaled on the inner sleeve 4 at the outer protruding end portion thereof. A similar ring or flange 13 is secured to the inner side of the inertia ring 9 by screws 14. The inner ring 13 has an inner peripheral bearing surface 15 which is journaled on the inner protruding end portion of the sleeve 4.

In operation, the inertia ring 9 is permitted a limited amount of rotation relative to the hub or inner sleeve by the yieldable connecting element 7. The rings 11 and 13 maintain the inertia member in concentric relationship with respect to the hub part and they also protect the connecting element 7 from radial thrust. The relative rotation between the inertia ring and the crankshaft has a damping effect upon the torsional vibrations of the shaft and reduces the latter to a point where they are not objectionable.

Although but several embodiments of this invention has herein been shown and described, it will be understood that various changes in the size, shape and arrangement of parts may be made without departing from the spirit of my invention and it is not my intention to limit its scope other than by the terms of the appended claims.

What I claim is:

1. In combination, a crankshaft for an internal combustion engine, a vibration damper for said crankshaft including an inertia member having a central passage, an outer sleeve removably mounted in said passage having an outwardly extending portion adjacent a side of said inertia member, a resilient connecting element within said outer sleeve and surface bonded to the inner periphery thereof, an inner sleeve nonrotatably mounted on said crankshaft having its outer periphery surface bonded to said resilient element and having end portions protruding axially beyond the ends of the latter and the ends of said outer sleeve, a pair of rings, one adjacent the outwardly extending portion of said outer sleeve and the other adjacent the opposite side of said inertia member and fixed thereto, and means for detachably fixing the first mentioned ring and the protruding portion of the outer sleeve to said inertia member, said rings having inner peripheral portions journaled on the end portions of said inner sleeve.

2. In combination, a crankshaft for an internal combustion engine, a vibration damper on an end of said crankshaft including an inertia member having a central opening, an outer sleeve in said opening having a flange adjacent one side of said inertia member, a rubber connecting element in said sleeve surface bonded to the inner periphery thereof, an inner sleeve bonded to said connecting element concentric with said outer sleeve and non-rotatably fixed to said crankshaft having axially protruding end portions extending beyond said flange and the opposite end of said outer sleeve respectively, means including a pair of rigid elements journaled on the protruding end portions of said inner sleeve for retaining said inertia member in concentric relation with said crankshaft, one of said rigid elements being fixed directly to said inertia element, means for fixing both said flange and the other rigid element to said inertia member, and means detachably securable to said crankshaft and engageable with said rigid element for holding said vibration damper on said crankshaft.

ROGER K. LEE.